(12) United States Patent
Repac

(10) Patent No.: US 9,597,815 B2
(45) Date of Patent: *Mar. 21, 2017

(54) FOOD COMMINUTION DEVICE

(71) Applicant: Genius GmbH, Limburg (DE)

(72) Inventor: Cedomir Repac, Brechen (DE)

(73) Assignee: Genius GmbH, Limburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/905,295

(22) PCT Filed: Jun. 12, 2015

(86) PCT No.: PCT/EP2015/063160
§ 371 (c)(1),
(2) Date: Jan. 15, 2016

(87) PCT Pub. No.: WO2015/189383
PCT Pub. Date: Dec. 17, 2015

(65) Prior Publication Data
US 2016/0158957 A1    Jun. 9, 2016

(30) Foreign Application Priority Data
Jun. 12, 2014 (DE) ........................ 10 2014 108 267

(51) Int. Cl.
*A47J 43/25* (2006.01)
*B26D 9/00* (2006.01)
(Continued)

(52) U.S. Cl.
CPC ................ *B26D 9/00* (2013.01); *A47J 23/00* (2013.01); *A47J 43/25* (2013.01); *B26D 1/30* (2013.01);
(Continued)

(58) Field of Classification Search
CPC .............................................. B26D 2003/288
(Continued)

(56) References Cited

U.S. PATENT DOCUMENTS

| 4,928,893 A | 5/1990 | Prindle |
| D343,098 S | 1/1994 | Shun |

(Continued)

FOREIGN PATENT DOCUMENTS

| CN | 102599830 A | 7/2012 |
| CN | 202775770 U | 3/2013 |

(Continued)

OTHER PUBLICATIONS

WIPO, Written Opinion of the International Searching Authority, mailed Sep. 2, 2015 in International Application No. PCT/EP2015/063160.

*Primary Examiner* — Mark Rosenbaum
(74) *Attorney, Agent, or Firm* — Hodgson Russ LLP

(57) ABSTRACT

The invention relates to a food comminution device having a base part, which bears a cutting part, and having an actuation part, which actuation part is articulatedly fixed to the base part and can be pivoted from a loading position toward the cutting part into a closed position in order to push food items for comminution through the cutting part and can subsequently be pivoted from the closed position into the loading position again. The food comminution device is characterized in that the base part has the outer contour of a cuboid as its outer contour, and in that the food comminution device has a collecting container, and in that, on one face surface of the base part, there is provided an opening for the sliding-in of the collecting container into the base part, and in that the cutting part is arranged on a first side surface of the base part, which side surface is adjacent to the face surface, and in that the cutting part and the actuation part are constituent parts of a first comminution tool, and in that the base part is a constituent part of a further comminution tool, and/or at least one further comminution tool is fixed to the base part, wherein the further comminution tool is arranged on a further side surface of the base part, which further side (Continued)

Figure 1:
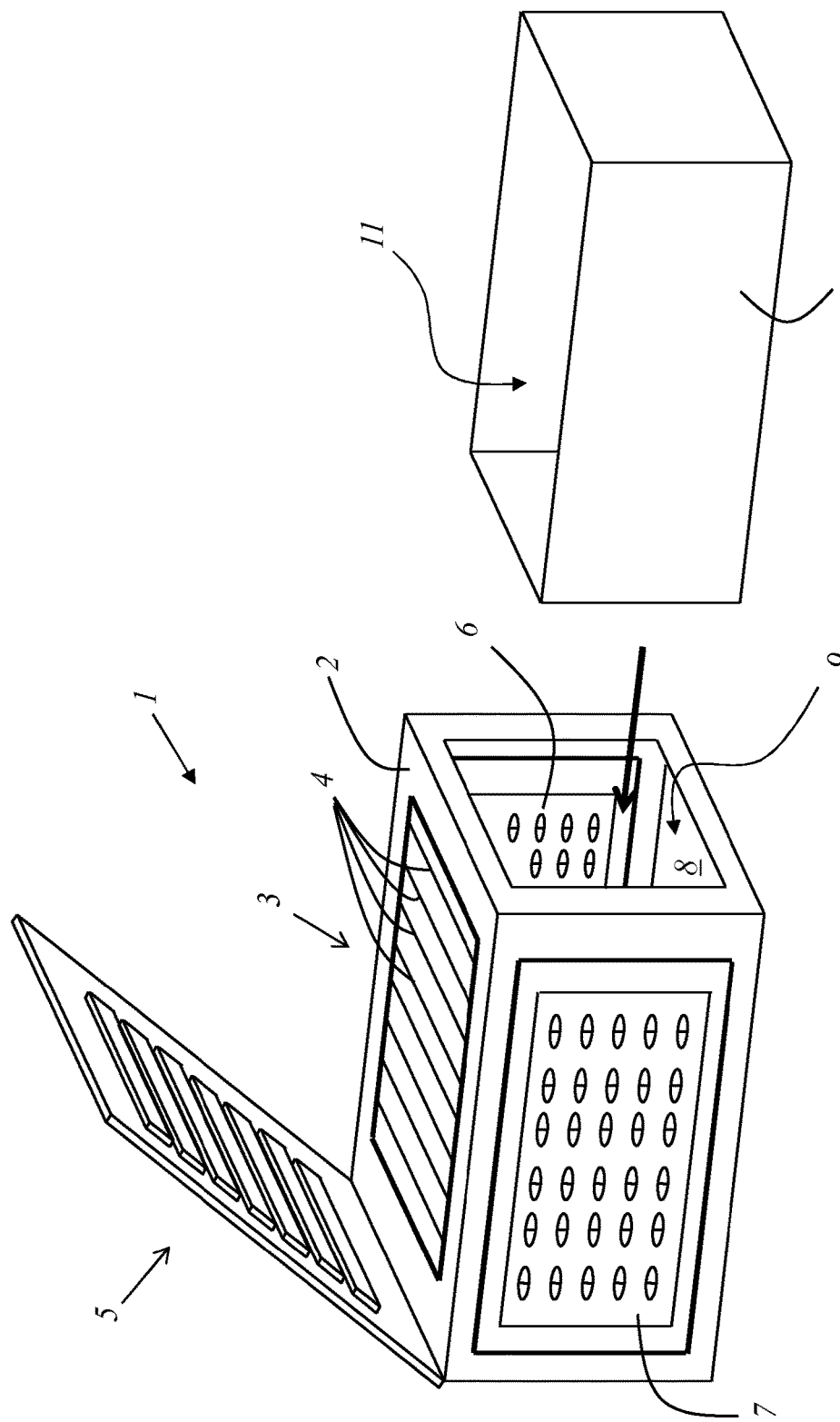

surface is adjacent to the face surface, and in that the collecting container can be arranged in the base part selectively in a first position, in which said collecting container collects food items comminuted by way of the first comminution tool, or in a second position, which differs from the first position and in which said collecting container collects the food items comminuted by way of the second comminution tool.

19 Claims, 11 Drawing Sheets

(51) Int. Cl.
| | |
|---|---|
| *B26D 1/30* | (2006.01) |
| *B26D 3/11* | (2006.01) |
| *B26D 3/28* | (2006.01) |
| *B26D 5/08* | (2006.01) |
| *B26D 7/06* | (2006.01) |
| *B26D 3/18* | (2006.01) |
| *A47J 23/00* | (2006.01) |
| *B26D 7/00* | (2006.01) |

(52) U.S. Cl.
CPC .............. *B26D 3/11* (2013.01); *B26D 3/185* (2013.01); *B26D 3/283* (2013.01); *B26D 5/08* (2013.01); *B26D 7/00* (2013.01); *B26D 7/06* (2013.01); *B26D 7/0608* (2013.01); *B26D 2003/285* (2013.01); *B26D 2007/0018* (2013.01)

(58) Field of Classification Search
USPC ........................................ 241/273.1, 100, 95
See application file for complete search history.

(56) References Cited

U.S. PATENT DOCUMENTS

| | | | |
|---|---|---|---|
| 6,135,375 | A | 10/2000 | Kaposi et al. |
| 2008/0029631 | A1 | 2/2008 | Boerner |
| 2009/0193981 | A1 | 8/2009 | Webb |
| 2009/0277343 | A1* | 11/2009 | Ghimire .................. B26D 3/20 99/537 |
| 2015/0367525 | A1 | 12/2015 | Repac |
| 2016/0158956 | A1* | 6/2016 | Repac ..................... A47J 43/25 241/95 |

FOREIGN PATENT DOCUMENTS

| | | |
|---|---|---|
| CN | 203280276 U | 11/2013 |
| DE | 1898/27111 A | 9/1899 |
| DE | 20 2009 011 687 U1 | 12/2009 |
| DE | 10 2009 023 167 A1 | 12/2010 |
| DE | 20 2011 050 041 U1 | 9/2011 |
| DE | 10 2012 211 360 A1 | 1/2014 |
| DE | 20 2013 105 875 U1 | 3/2014 |
| WO | 2006/049639 A1 | 5/2006 |

* cited by examiner

FOOD COMMINUTION DEVICE

CROSS-REFERENCE TO RELATED APPLICATIONS

The present application is the U.S. national phase of International Application No. PCT/EP2015/063160 filed Jun. 12, 2015, which claims priority of German Application No. 10 2014 108 267.2 filed Jun. 12, 2014, the entirety of which is incorporated herein by reference.

FIELD OF THE INVENTION

The invention relates to a food comminution device having a base part, which bears a cutting part, and having an actuation part, which actuation part is articulatedly fixed in particular to the base part and can be pivoted from a loading position toward the cutting part into a closed position in order to push food items for comminution through the cutting part and can subsequently be pivoted from the closed position into the loading position again.

BACKGROUND OF THE INVENTION

DE 10 2009 023 167 A1 has disclosed a device for cutting foodstuffs, such as fruit and vegetables, having a cutting part which has multiple cutting edges, and having an actuation part, said cutting part and actuation part being mounted so as to be pivotable relative to one another. To cut the items for cutting, the actuation part is pushed towards the cutting part, wherein the actuation part has a plunger which pushes the items for cutting through the cutting part, wherein the cutting edges protrude into corresponding depressions of the plunger. The cutting part has a cutting frame in which cutting blades are held. The device furthermore has a cover part for mounting on a receiving container for the cut items for cutting, wherein the cover part has an opening which forms a passage for the cut items for cutting.

A food comminution device of the type mentioned in the introduction is also known from DE 20 2011 050 041. Said food comminution device has a special cutting insert with a first cutting blade arrangement which is arranged in a first region and with a second cutting blade arrangement which is arranged in a second region which differs from the first region, such that selectively either the first cutting blade arrangement or the second cutting blade arrangement can be positioned in a working position within the food comminution device and used.

A similar food comminution device is known from DE 10 2012 224 517 A1. The food comminution device is designed to be set down on a worktop for a comminution process, and has an actuation part and also a base part which has a cutting part. The base part and the actuation part are articulatedly connected such that, for pushing through food items for comminution, the actuation part can be pivoted from a loading position toward the cutting part into a closed position and subsequently from the closed position back into the loading position. The food comminution device is distinguished by the fact that the food comminution device has at least one drive device, in particular a spring drive, for assisting or effecting the pivoting movement from the closed position into the loading position and/or from the loading position into the closed position.

DE 21 2005 000 048 U1 has disclosed a food processing device having a container. Onto the opening of the container there is mounted a tray which has a multiplicity of cutters. Furthermore, a cover is pivotably attached to the container, which cover has a pressing plunger for pushing items for comminution through the cutters.

The abovementioned devices known from the prior art offer only the possibility of comminuting food items by pushing them through a cutting part with the aid of a pivotably mounted pressing plunger. In the case of said devices, there is no possibility of comminuting food items in some other way. The user must therefore use other food comminution devices if it is sought to comminute the food items in some other way.

DE 10 2012 211 360 A1 has disclosed a square grater with four non-removable grating surfaces, arranged orthogonally with respect to one another, for the grating of items for grating, in particular of food items. The square grater has a square tubular cross section, and has a container, which can be slid therein, for collecting items for grating. Similar square graters are known from U.S. Pat. No. 343,098, DE 10 2005 011 310 A1 and from GB 189827111 A. Said devices offer only the possibility of grating food items. Said devices do not offer other possibilities for the comminution of food items.

DE 20 2009 011 687 U1 has likewise disclosed a device of the type mentioned in the introduction. Said device has a collecting container on which an actuation part with a pressing plunger is pivotably mounted. The actuation part serves for pushing food items for comminution through a cutting grate mounted onto the opening of the container. Furthermore, the actuation part is in the form of a kitchen slicer which has a slide path over which an item for comminution can be slid, and which has a blade arranged on the slide path such that, as the item for cutting is slid on the slide path, said blade cuts off parts of the item for cutting. A first glance, said device offers the advantage that the food items can be comminuted in a different way. However, the device has the particular disadvantage that, owing to the integrated slicer, the actuation part cannot withstand relatively high loads during the pressing of items for comminution through the cutting grate. It is therefore provided merely that the food item slices produced by way of the slicer are further comminuted, after the slicing process, by being pushed through the cutting grate. Said device does not allow relatively large food items that have not been previously sliced, such as for example relatively large potato pieces, to be pushed through.

US 2009/0193981 A1 has disclosed a comminution device formed in the manner of tongs, which comminution device is held in one hand during the comminution process. The comminution device has a single comminution tool with a pressing plunger which can be pivoted toward one of several different cutting segments in order to push a food item for comminution through the respective cutting segment. The cutting segments are arranged on a wheel so as to be rotatable relative to the pressing plunger.

SUMMARY OF THE INVENTION

It is therefore the object of the present invention to specify a food comminution device which makes it possible for food items to be comminuted in different ways, and which can furthermore be handled quickly and efficiently and which can be of compact design.

The object is achieved by way of a food comminution device of the type mentioned in the introduction which is distinguished by the fact that a. the base part has the outer contour of a cuboid as its outer contour, and in that b. the food comminution device has a collecting container, and in that,
c. on one face surface of the base part, there is provided an opening for the sliding-in of the collecting container into the base part, and in that
d. the cutting part is arranged on a first side surface of the base part, which side surface is adjacent to the face surface, and in that
e. the cutting part and the actuation part are constituent parts of a first comminution tool, and in that
f. the base part is a constituent part of a further comminution tool, and/or at least one further comminution tool is fixed to the base part, wherein the further comminution tool is arranged on a further side surface of the base part, which further side surface is adjacent to the face surface, and in that
g. the collecting container can be arranged in the base part selectively in a first position, in which said collecting container collects food items comminuted by way of the first comminution tool, or in a second position, which differs from the first position and in which said collecting container collects the food items comminuted by way of the second comminution tool.

The food comminution device according to the invention has the very special advantage that several different comminution tools are made available in order to be able to comminute food items in different ways.

Furthermore, the food comminution device according to the invention has the very special advantage that the individual comminution tools can all be arranged in their respective functional positions on a base part, and therefore no great effort has to be expended for conversion purposes if, after the use of one of the comminution tools, it is sought to use another comminution tool. Rather, as discussed in detail further below, it is necessary merely to adapt the position of the collecting container and the orientation of the food comminution device in space, normally relative to a kitchen worktop.

Furthermore, the food comminution device according to the invention has the special advantage that the comminution tools do not need to be stored individually and separately from one another when they are not needed. Rather, the food comminution device as a whole, together with the comminution tools situated in their respective functional positions, can be easily and quickly stored, for example in a kitchen cupboard, and is readily available when it is needed again, without the need for cumbersome setup or conversion work.

In a special embodiment, the food comminution device has the first comminution tool and at least one further comminution tool simultaneously on the same base part. Alternatively or in addition, it may be provided that the base part is simultaneously a constituent part both of the first comminution tool and of the further comminution tool or multiple further comminution tools.

In a special embodiment, the at least one further comminution tool has no components in common with the first comminution tool, or has only the base part in common with the first comminution tool. Such an embodiment has the advantage that the comminution tools can be actuated independently of one another. The further comminution tool is preferably, aside from the base part, composed of different components than the first comminution tool.

Alternatively or in addition, it may be provided in particular that the first comminution tool and the further comminution tool can be actuated independently of one another and/or are not reliant on one another with regard to their functionality. In particular, the food comminution device may advantageously be designed such that the further comminution tool, aside from the base part, has no components without which the first comminution tool is unable to function.

In particular if the further comminution tool is formed from components which differ from the cutting part and the actuation part, it is advantageously achieved that said components do not need to be changed over in cumbersome fashion if it is sought to use the further comminution tool, and that said components are not subjected to any loads, which overburden them, during use of the further comminution tool.

The food comminution device according to the invention may have multiple further comminution tools. For example, it may advantageously be provided that a further comminution tool is in the form of a slicer. Alternatively or in addition, it may advantageously be provided that a further comminution tool is in the form of a grater. In particular, the food comminution device may also have multiple different graters, for example a coarse grater and a fine grater, as further comminution tools.

Alternatively or in addition, it may also be provided that the food comminution device has, as a further comminution tool, a spiral cutter, in particular in the form of a sharpener. Such an embodiment has the very special advantage that food items for comminution, such as for example carrots, radishes, zucchini or cucumbers, can be cut into spiral ribbons, which are suitable in particular for decorating a meal, such as for example a prepared salad.

In a particularly advantageous embodiment, the spiral cutter can be inserted, in particular instead of the cutting part, into a receptacle of the base part. Such an embodiment has the special advantage that, after a comminution process in which food items have been pushed through the cutting part with the aid of the actuation part, the user can quickly and efficiently use the device for producing spiral-shaped ribbons. Here, it may advantageously be provided that the comminution tool can be inserted in an accurately fitting manner and/or with detent action into the receptacle. It is ensured in this way that the comminution tool is held securely in its working position.

The spiral cutter may advantageously have a holding plate which, in terms of shape and size, has the same outer contour as the cutting part or some other comminution tool. It is advantageously achieved in this way that the cutting part or the comminution tool can selectively be securely and reliably fixed in the receptacle of the base part without great effort and without the need for additional fixing components.

In a very particularly advantageous embodiment, the comminution tool has a holding plate into which at least one of several different spiral cutting inserts can be selectively inserted. In particular, it may advantageously be provided that each spiral cutting insert has an in particular conical receiving chamber for the insertion of food items, on the wall of which receiving chamber there is arranged in each case one cutting blade, and/or that each spiral cutting insert has in each case one in particular conical receiving chamber for the insertion of food items, in which receiving chamber the food items can be rotated. The spiral cutting inserts may differ in particular in terms of their shape and/or size and/or in terms of the thickness and/or width of the spiral-shaped ribbons that can be cut therewith and/or in terms of the number of spiral-shaped ribbons produced simultaneously during a cutting process.

In a special embodiment, the food comminution device has an insert which can be inserted in particular in an accurately fitting manner and/or with detent action into a receptacle of the base part and which has both the cutting part and the spiral cutter. Such an embodiment has the special advantage that the food comminution device does not need to be converted if, after a comminution process in which the cutting part was used, it is subsequently sought to cut spiral-shaped ribbons; or conversely if, after the cutting of spiral-shaped ribbons, it is sought to perform comminution using the cutting part.

In a very different embodiment, the actuation part has the spiral cutter. Said spiral cutter may in particular be arranged such that it is used preferably when the actuation part is closed, that is to say when the actuation part has been pivoted against the base part. If spiral-shaped ribbons are now cut by way of the spiral cutter, these can fall through the receptacle, into which no cutting part is inserted for this cutting process, for example into a collecting container. It is alternatively also possible for the base part to have a dedicated passage opening for this purpose.

The spiral cutter may advantageously be constructed so as to have an in particular conical receiving chamber for the insertion of food items, such as for example a carrot, a radish, a cucumber or a zucchini, on the wall of which receiving chamber there is arranged a cutting blade. Alternatively or in addition, it may also be provided that the spiral cutter has an in particular conical receiving chamber for the insertion of food items, in which receiving chamber the food items can be rotated. Furthermore, the wall of the receiving chamber has an opening through which the spiral-shaped ribbon can pass out of the receiving chamber.

The cutting blade is preferably arranged such that, during a rotational movement, similarly to the situation when sharpening a pencil, a spiral-shaped layer is cut off in encircling fashion from the rotating food item at the end side. For this purpose, the cutting edge of the cutting blade may be arranged so as to project into the receiving chamber, wherein the parallel spacing of the cutting blade to the receiving chamber wall determines the thickness of the layer that is cut off.

According to an independent concept of the invention with regard to the comminution tool in the form of a sharpener, which may also be realized independently of the rest of the construction of the food comminution device, it is possible for layers of different thickness to be cut off in a manner dependent on the direction of rotation. Such an embodiment firstly has the very special advantage that the user can decide individually whether he or she wishes to cut the food items into thin or thick spiral-shaped ribbons. Secondly, such an embodiment has the very special advantage that particularly brittle or sensitive food items, in the case of which the ribbons tend to break if they are cut too thinly, can be alternatively cut into relatively thick spiral-shaped ribbons. Conversely, food items which are unsuitable for cutting into thick spiral-shaped ribbons can be selectively cut into thin spiral-shaped ribbons. In short: Such an embodiment makes it possible in particular for the cutting thickness to be adapted to the respective food items.

In particular, it may advantageously be provided that the spiral cutter cuts off a layer of a first thickness from a food item rotating clockwise in the receiving chamber, and that the spiral cutter cuts off a layer of a second thickness, which differs from the first thickness, from a food item rotating counterclockwise in the receiving chamber.

The cutting into spiral-shaped ribbons of different layer thicknesses, in particular in a manner dependent on the direction of rotation, may also be realized for example through the use of a pendular cutting blade which has two cutting edges. Here, it may be provided in particular that one cutting edge serves for cutting into thin spiral-shaped ribbons, whereas the other cutting edge serves for cutting into thick spiral-shaped ribbons.

In particular, the pendular cutting blade may for example be arranged such that, with regard to the first cutting edge, a first spacing to the wall of the receiving chamber is realized in the case of a clockwise rotation of the food item, whereas a second spacing of the second cutting edge to the receiving chamber is realized in the case of a counterclockwise rotation of the food item, wherein the first spacing differs from the second spacing. In particular, the cutting blades may be oriented parallel to one another and/or oppositely to one another with respect to the orientation of the cutting edges. In an advantageous embodiment, the pendular cutting blade is suspended such that, in the case of a clockwise rotation of the food item, the first cutting edge automatically rotates into the receiving chamber, whereas the second cutting edge is rotated out of the receiving chamber, and that, conversely, in the case of a counterclockwise rotation of the food item, the second cutting edge is automatically rotated into the receiving chamber, whereas the first cutting edge is rotated out of the receiving chamber.

It may advantageously also be provided in particular that the comminution tool has a pendular cutting blade with two cutting edges, wherein, in particular automatically, in each case one of said cutting edges cuts into the food items for comminution in a manner dependent on the direction of rotation of the food items.

In a special embodiment, the spiral cutter is designed to simultaneously cut off multiple spiral-shaped ribbons from a food item. In this way, it is possible for vegetables to be advantageously cut into vegetable noodles, for example zucchini noodles. The spiral cutter may in particular have a cutting unit which splits the layer to be cut off, or the layer that has already been cut off, into multiple mutually parallel strips. Alternatively or in addition, it may also be provided that the spiral cutter has a cutting blade, which cuts off a layer from the item for cutting, and a cutting unit, which has further cutting blades arranged perpendicular to the cutting blade. The further cutting blades may serve for splitting the layer to be cut off, or the layer that has already been cut off, into multiple mutually parallel strips.

The food comminution device may have precisely one spiral cutter. It is however by all means advantageously possible for the food comminution device to have a further spiral cutter or multiple further spiral cutters. In particular, it may advantageously be provided that the further spiral cutter is of a different size than the spiral cutter, and/or in that the receiving chamber of the further spiral cutter has a different wedge angle than the receiving chamber of the spiral cutter. It is made possible in this way to selectively cut spiral-shaped ribbons of different form. It is also possible to use a smaller one of the spiral cutters in the case of a food item of small diameter, and to use a larger one of the spiral cutters in the case of a food item of relatively large diameter.

Alternatively or in addition, it may advantageously be provided that the food comminution device has, as a further comminution tool, a pitting means for the pitting of stone fruit. Such an embodiment has the very special advantage that not only stoneless food items but also stone fruit can be processed. This may be realized in particular in that pitting is performed in a first working step, and in that the pitted stone fruit is subsequently comminuted further, in particular by way of one of the other comminution tools. For example, the pitted stone fruit may be further processed by being pushed through a cutting part by way of the actuation part.

It is also possible for the pitted fruits not to be comminuted further but to be used in one piece.

In particular, it may advantageously be provided that the food comminution device has a stone fruit holder for holding at least one piece of stone fruit, and has at least one pushing-out spike such that, by means of a pivoting movement of the pushing-out spike relative to the stone fruit holder, the stone of a piece of stone fruit held by the stone fruit holder can be pushed out of the stone fruit.

In a special embodiment, the pushing-out spike is fixed to the actuation part. It is also possible for the pushing-out spike to be detachably fixable to the actuation part, in particular without the use of tools. For example, in a special embodiment, it is provided that the pushing-out spike is removed from the actuation part when the actuation part is used for pushing items for comminution through the cutting part, and that the pushing-out spike is fastened to the actuation part when it is sought to pit stone fruit.

The pushing-out spike may advantageously be in the form of a blade, or may have at least one blade, which during the pitting process pierces through the skin and the flesh of the stone fruit until it reaches the stone, and which pushes said stone ahead of itself until the stone is pushed out of the respective piece of stone fruit. In this way, it is ensured that the flesh of the fruit is not compressed or is only insignificantly squashed. Particularly high stability of the pushing-out spike may be achieved by virtue of the latter being formed by two criss-crossing blades.

The fixing of the pushing-out spike to the actuation part may advantageously be realized in particular by way of a plug-type connection. A plug-type connection advantageously makes it possible for the pushing-out spike to be fixed in stable fashion to the actuation part, wherein it is nevertheless made possible for the pushing-out spike to be removed again quickly and in uncomplicated fashion.

As an alternative to a pushing-out spike that is fixed or fixable to the actuation part, it is the case in a special embodiment that a further actuation part is provided which has the pushing-out spike and which is articulatedly fixable, instead of the actuation part, to the base part. In this embodiment, comminution of the food items for comminution is performed using the actuation part in order to push the food items through the cutting part. If, instead of comminution, it is sought to pit stone fruit, the actuation part is detached from the base part and, instead, the further actuation part, which has the pushing-out spike (or multiple pushing-out spikes for the pitting of several pieces of stone fruit simultaneously), is articulatedly fixed to the base part.

The stone fruit holder is preferably designed and arranged such that the piece of stone fruit to be pitted in each case is reliably held in a pitting position during the pitting process, in particular without the piece of stone fruit that is to be pitted being able to deflect out of the path of the pushing-out spike.

In a special embodiment, the stone fruit holder can be inserted, in particular in an accurately fitting manner and/or with detent action, into a receptacle of the base part. It may very particularly advantageously be provided that the stone fruit holder can be inserted, instead of the cutting part, into the receptacle if it is sought to perform a pitting process instead of a comminution process. This may be realized for example by virtue of the stone fruit holder having a holding plate which, in terms of shape and size, has the same outer contour as the cutting part. Similarly, in a special embodiment, it is provided that, if a comminution process is to be performed, the cutting part can be inserted, in particular in an accurately fitting manner and/or with detent action, into the receptacle.

In a very particularly advantageous embodiment, the device has a storage container for a multiplicity of pieces of stone fruit to be pitted. In particular, it may advantageously be provided that the storage container is designed and arranged such that, after every pitting process, at least one piece of stone fruit which is to be pitted performs an, in particular automatic, follow-up movement to the stone fruit holder, in particular into the pitting position.

It is pointed out that, in the context of this application, the wording "a piece of stone fruit" refers in each case to an entire item of stone fruit, and not for example a piece of an item of stone fruit. A piece of stone fruit may for example be a cherry or a plum or a mirabelle.

As will be described in more detail further below, the food comminution device may advantageously have a collecting container for the comminuted food items. In particular, it is possible for the stones and/or the pitted stone fruit to be collected, in particular automatically, in the collecting container. In particular, it may advantageously be provided that the collecting container has two mutually separate chambers, and the pitting process is performed such that the stones are collected in one chamber and the pitted items of stone fruit are collected in the other chamber. It may also be provided that, to form two chambers, a partition can be inserted into the collecting container.

In a special embodiment, the actuation part and/or the further actuation part has multiple pushing-out spikes, which are designed and arranged to pit multiple pieces of stone fruit simultaneously. For this purpose, it may be provided in particular that the stone fruit holder is designed and arranged so as to hold multiple pieces of stone fruit simultaneously in each case in a pitting position.

A food comminution device which, aside from the first comminution tool, which comprises the cutting part and the actuation part, has both a slicer and also two different graters as further comminution tools makes it possible, in particular if means for generating spiral-shaped ribbons and/or means for pitting stone fruit are additionally provided, to satisfy most comminution requirements that arise in everyday cooking situations.

The food comminution device is preferably designed such that the individual comminution tools can be operated independently of one another. In particular, such an embodiment has the particular advantage that the comminution tools are not reliant on one another, and one comminution tool can be utilized even if another comminution tool cannot be utilized, for example because it is dirty or defective.

As will be discussed in more detail further below, the food comminution device may advantageously be designed in particular such that each comminution tool is assigned one of several different setting-down orientations of the food comminution device, such that the food comminution device merely has to be set down on a worktop in the corresponding setting-down orientation in order to enable a particular one of the comminution tools to be utilized. To achieve this in particular, the base part has, as its outer contour, the outer contour of a cuboid. Such an embodiment makes it possible for different comminution tools to be arranged on different surfaces of the base part, such that, by virtue of the food comminution device being set down in a suitable manner, for example onto one of the surfaces, which are preferably equipped with supporting feet, another surface, which bears the desired comminution tool, is placed into an upwardly directed working position, in which the desired comminution tool can be utilized.

The particular form of the base part is particularly well suited to the arrangement of different comminution tools on different surfaces, and to the use of the respectively oppositely situated surface as the setting-down surface respectively assigned to the comminution tool.

In particular, the base part may be in the form of a frame which has, as an outer contour, the outer contour of a polyhedron, in particular of a cuboid. An embodiment of the base part in the form of a frame makes it possible in particular for the comminution tools to be fixed, preferably in removable fashion, in the frame openings. Furthermore, a frame construction is particularly stable and can be produced inexpensively.

As already mentioned, it may advantageously be provided that the comminution tools are arranged or arrangeable separately from one another in each case on or in one of the different surfaces of the base part. In particular, it may advantageously be provided that at least one comminution tool is arranged on or in one of the different surfaces of the base part, and that surface which is situated opposite the surface is formed as a setting-down surface onto which the base part can be set down in order for the comminution tool to be used. As will be discussed in more detail further below, the setting-down surface may be equipped with supporting feet.

In particular, it may advantageously be provided that a further comminution tool is arranged on or in the setting-down surface. If, after the food comminution device has been set down on the setting-down surface, it is sought to use the comminution tool of the setting-down surface, it is merely necessary, aside from a possible change in position of the collecting container, as will be discussed in more detail further below, for the food comminution device to be rotated through 180 degrees about a horizontal axis in order that the comminution tool of the setting-down surface is placed into its working position and can be utilized.

As already mentioned, it may advantageously be provided that at least one comminution tool or at least a part of one of the comminution tools is detachably fixed or fixable to the base part, in particular without the use of tools and non-destructively. Alternatively or in addition, it may also be provided that multiple comminution tools or in each case at least parts of different comminution tools are detachably fixed or fixable, in particular independently of one another, to the base part. Such an embodiment has the special advantage that the comminution tools, or at least parts of the comminution tools, can, for a cleaning process, be temporarily detached from the base part or exchanged for other comminution tools or other parts of comminution tools, for example if it is sought to insert a different type of comminution tool, or if said comminution tools or parts of the comminution tools are defective.

For the detachable fixing of the comminution tool or of the further comminution tool or of a component of the comminution tool or component of the further comminution tool, it is for example possible for at least one detent element to be provided. In particular, it may advantageously be provided that the comminution tool to be fixed, or the component to be fixed, is inserted with detent action into an opening or an aperture, in particular a frame opening, of the base part, and can be removed again without the use of tools and non-destructively.

In order that the food comminution device can be set down in different orientations for the use of different comminution tools, without the actuation part, which is articulatedly connected to the base part, being inadvertently moved out of its closed position, it is the case in a special embodiment that a locking device is provided by means of which the actuation part can be fixed in the closed position. For example, the locking device may have a blocking bar which is arranged on the actuation part and which, in a blocking position, engages into an opening of the base part. Conversely, it is self-evidently also possible for the blocking bar to be arranged on the base part and to engage, in a locking position, into an opening of the actuation part. The blocking bar and the opening are preferably arranged in the region of the free end of the actuation part.

In a special embodiment, at least one comminution tool is arranged non-detachably on the base part. Such an embodiment is expedient if removability of a comminution tool, for example for a cleaning process, is not necessary, and/or if inexpensive production of the food comminution device is desirable. Here, the comminution tool may advantageously be produced at least partially in one piece together with the base part, for example as an injection-moulded component. For example, it may advantageously be provided that the slide path of a comminution tool in the form of a slicer is produced in one piece together with the base part or with parts of the base part, and that it is merely the slicer cutting blade that is retroactively inserted. It is however also possible for the slicer cutting blade to be inserted already during the production process of the base part and of the slide path, in particular to be partially insert-moulded in a plastics injection-moulding process.

In particular, it is advantageous if the collecting container for the comminuted food items of the food comminution device is produced from a translucent and/or transparent material in order that the fill level can be visually checked, for example through a window in the base part. In particular, it may advantageously be provided that the collecting container has substantially the same outer contour as the base part and/or as a receptacle in the base part for the collecting container.

In particular, it may be advantageously provided that the collecting container, in particular such as a drawer, can be pushed into the base part and removed from the base part again. Such an embodiment offers the special advantage that the collecting container can be placed into the respectively required collecting position in a simple manner and can be removed from said collecting position again in a simple manner.

In a special embodiment, the base part has a receptacle for the collecting container. As will be discussed in more detail further below, it may be provided in particular that the collecting container can be inserted in different positions into the receptacle. This is the case in particular in order that the filling opening of the collecting container can be oriented toward the comminution tool to be used in each case. The receptacle and a collecting container are preferably designed such that the collecting container is securely held in the respective position and cannot inadvertently move into another position. For this purpose, the receptacle and/or the collecting container may for example have guide and abutment elements which hold the inserted collecting container in its respective position.

In a special embodiment, the face surface having the opening for the sliding-in of the collecting container and/or the opening are of square form. Such an embodiment makes it possible for the collecting container to be inserted through the opening into the base part in four different positions, wherein the filling opening of the collecting container faces toward different surfaces of the cuboid in each case.

The collecting container can preferably be arranged in the base part, in particular slid into the base part, such that said collecting container automatically collects the comminuted food items.

To prevent the collecting container from inadvertently sliding out of the receptacle, and/or in order to prevent the collecting container from undesirably moving in the receptacle, it is advantageously possible for a fastening device, in particular a detent device, to be provided for temporarily fixing the collecting container in the receptacle. Said detent device may advantageously be designed such that no additional working step is required for fixing or release, but rather such that the detent device is actuated automatically during the insertion and removal of the collecting container.

In a special embodiment, the different possible positions of the collecting container assigned to different comminution tools differ by way of a different orientation of the opening of the collecting container, wherein the collecting container takes up substantially the same spatial volume within the base part in all positions.

In a special embodiment, the base part has, in particular in one of the surfaces and more particularly in the face surface situated opposite the face surface that has the opening for the collecting container, at least one window through which the collecting container arranged in the base part, and/or the fill level of said collecting container, can be viewed. Such an embodiment has a special advantage that the user does not need to remove the collecting container from the base part in order to be able to inspect the fill level. Rather, the user does not need to interrupt the comminution process in order to inspect the fill level.

As already discussed, the food comminution device is preferably designed to be set down on a worktop for a comminution process. In particular, the food comminution device is preferably designed to be set down on a worktop selectively in one of several different setting-down orientations for a comminution process. Each comminution tool may advantageously be assigned a setting-down orientation into which the food comminution device can be placed in order for the comminution tool to be used.

In a special embodiment, the food comminution device is designed to be set down on a worktop, for example on a kitchen worktop, in a first setting-down orientation for a comminution process using the first comminution tool and in a further setting-down orientation, which differs from the first setting-down orientation, for a comminution process using the further comminution tool.

In an advantageous embodiment, supporting feet are arranged in particular on the base part, which supporting feet enable the food comminution device to be securely set down in the different setting-down orientations. In particular, the supporting feet may be produced from an elastic material and/or from a material with high static friction, for example from rubber.

The supporting feet preferably protrude such that the comminution tools always remain spaced apart from the worktop on which the food comminution device is set down. It is ensured in this way that no comminution tool is damaged as a result of contact with a worktop while another comminution tool is currently being used.

In a particularly advantageous embodiment, at least one supporting foot is arranged such that it can be used for different setting-down orientations. For this purpose, the supporting foot may be arranged for example at or along an edge of the base part, which is in particular in the form of a polyhedron or cuboid. In particular, the supporting foot may also be arranged at a corner of the base part, which is in particular in the form of a polyhedron or cuboid. In this way, it is made possible for the supporting foot arranged at a corner to be used for setting down on each of the surfaces that adjoin the corner. Since the base part, as an outer contour, has the outer contour of a cuboid, just eight supporting feet arranged at the corners and protruding in each spatial direction are sufficient in order to enable the base part to be set down on each of its six surfaces.

Alternatively, it is however also possible for the base part to have supporting feet which serve exclusively for setting down in a single one of the possible setting-down orientations. In particular, it is for example possible for the base part, on at least one of its surfaces, to have merely supporting feet which project perpendicular to the surface.

In particular, the base part, but also the comminution tools or parts of the comminution tools, may advantageously be produced as an injection-moulded part, in particular as a plastics injection-moulded part. It may also be provided that the base part has at least one component produced as an injection-moulded part, in particular as a plastics injection-moulded part. In a special embodiment, the base part is assembled from multiple parts, in particular from multiple injection-moulded components.

In a very particularly advantageous embodiment, on the further side surfaces that are adjacent to the face surface, there is arranged in each case one further comminution tool, specifically a coarse grater, a fine grater and a slicer. Such an embodiment has the advantage that it offers four surfaces for four comminution tools, specifically for the first comminution tool and for three further comminution tools, and furthermore makes it possible for the collecting container to be inserted easily and securely in different rotational positions via the face side, in each case such that the container opening is oriented so as to face upward and toward the comminution tool to be used in each case, which, by way of a suitable setting-down orientation of the base part, is arranged at the top.

BRIEF DESCRIPTION OF THE DRAWING VIEWS

Figure 2:
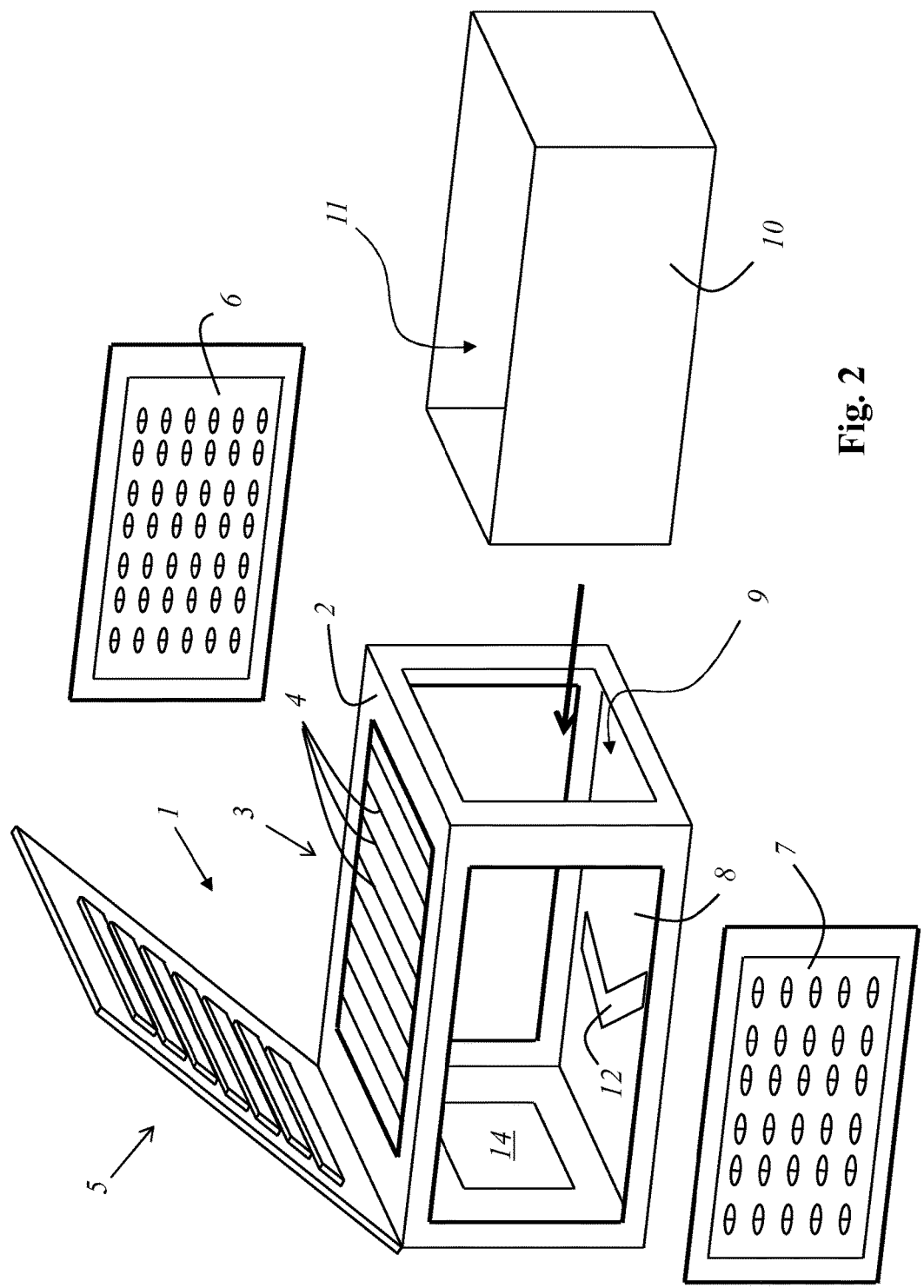
Figure 3:
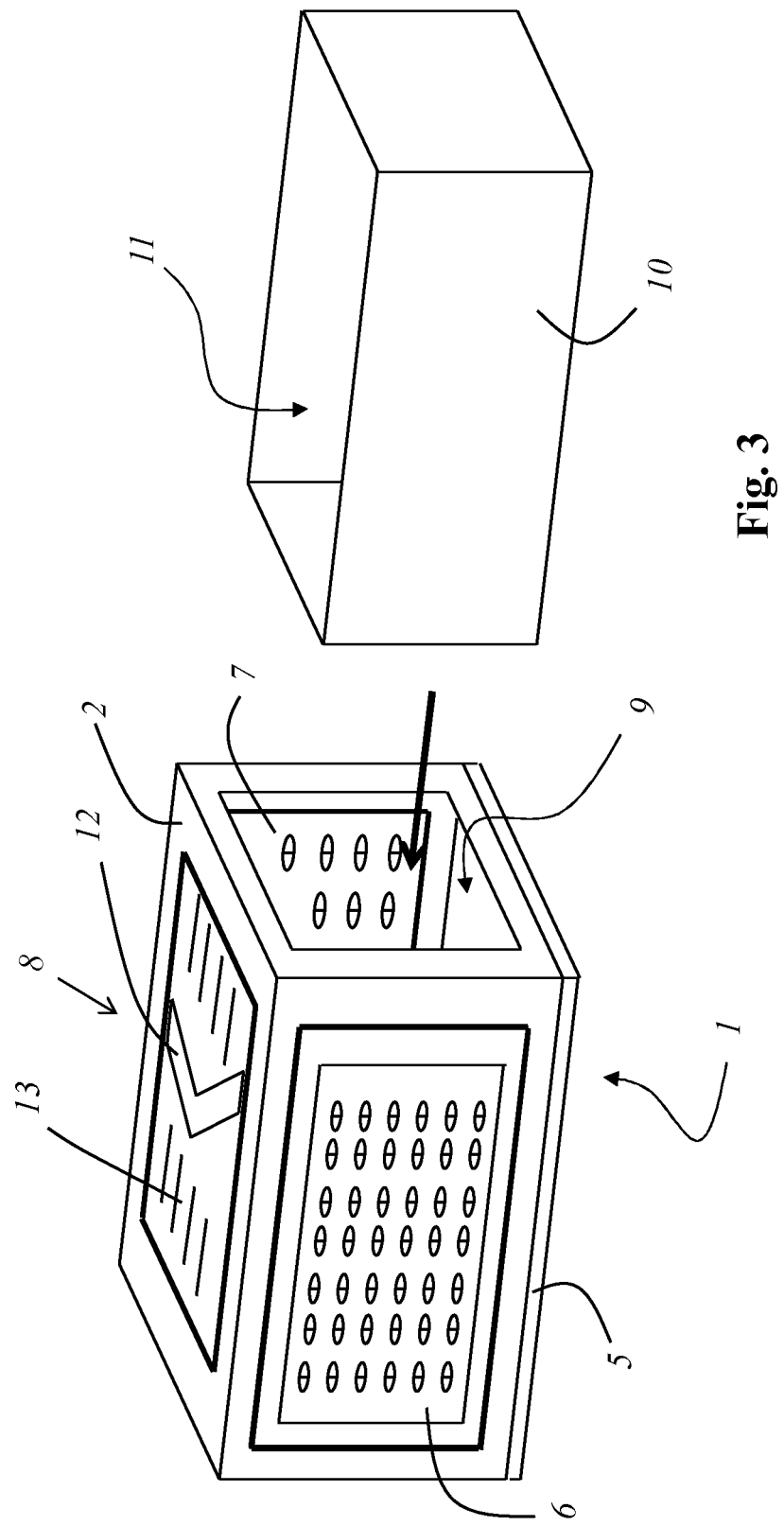
Figure 4:
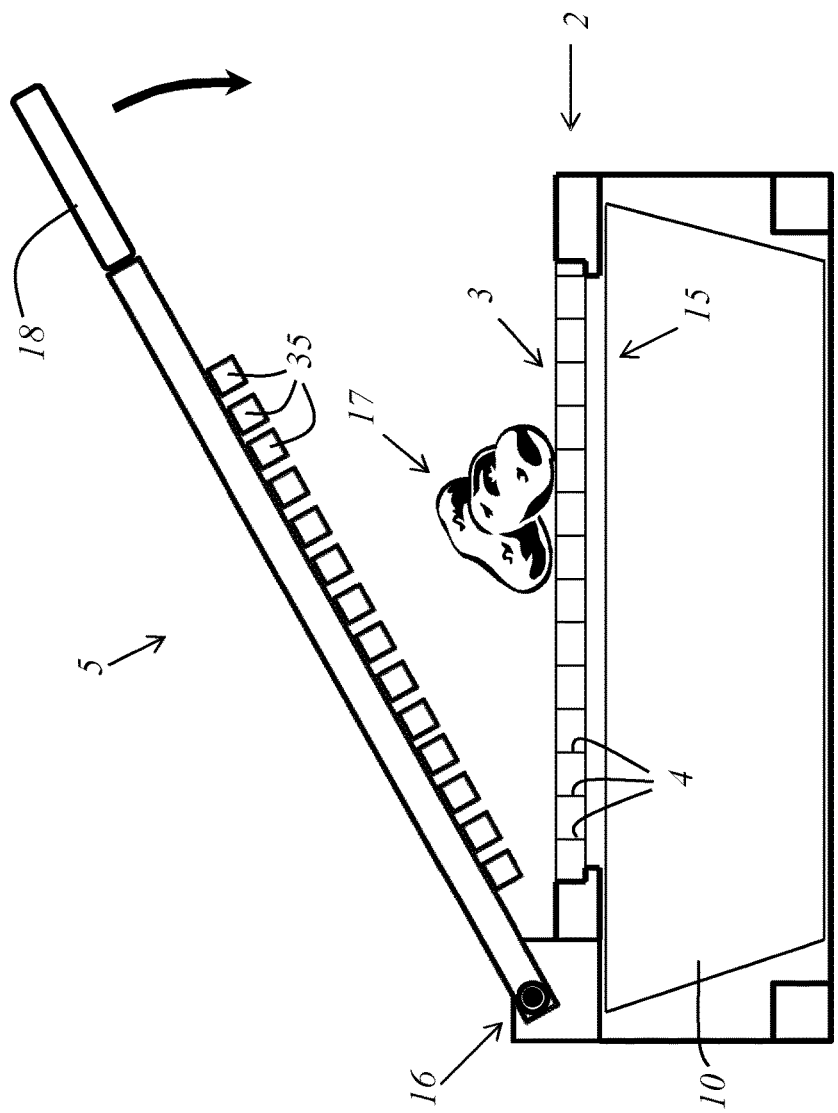
Figure 5:
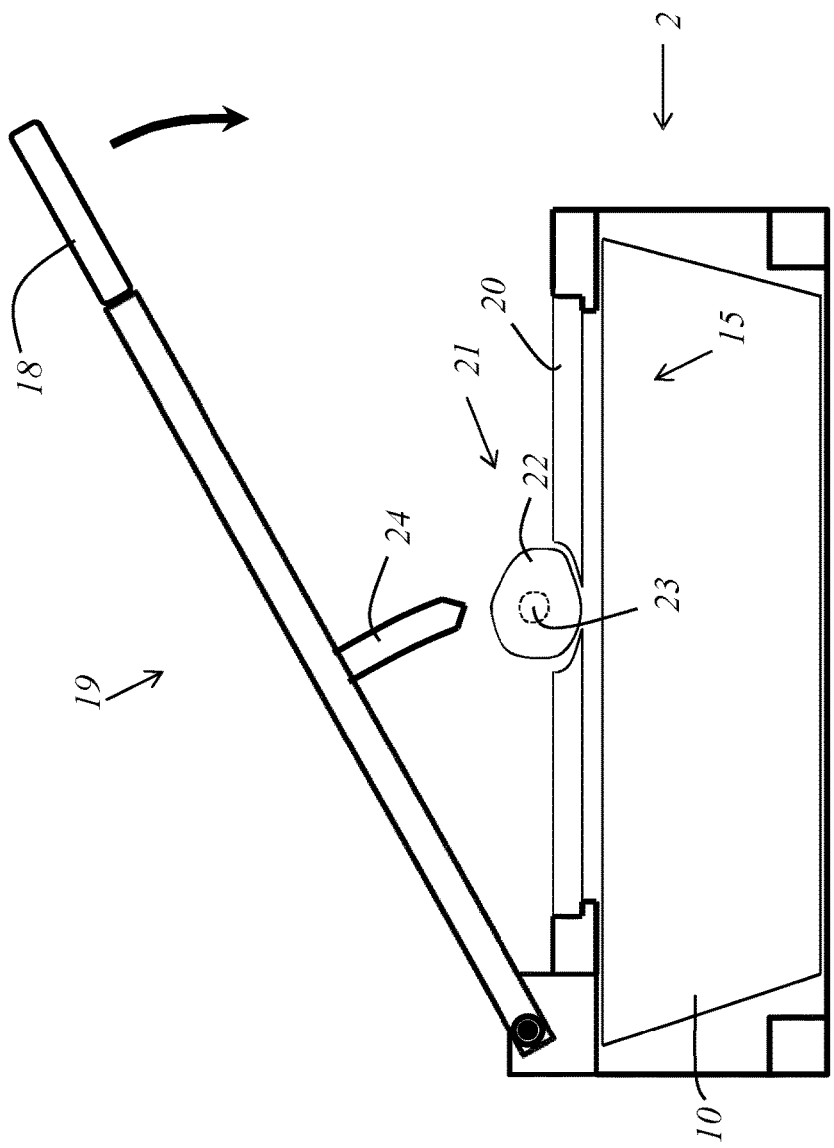
Figure 6:
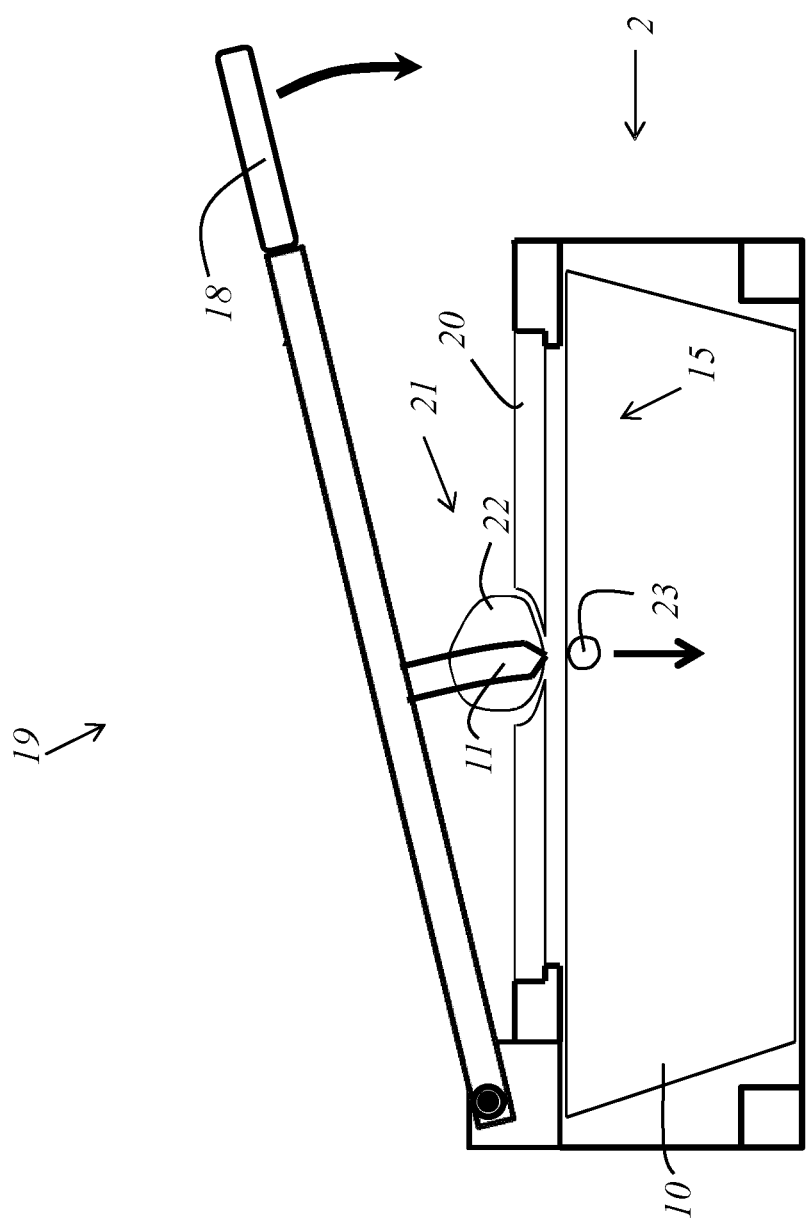
Figure 7:
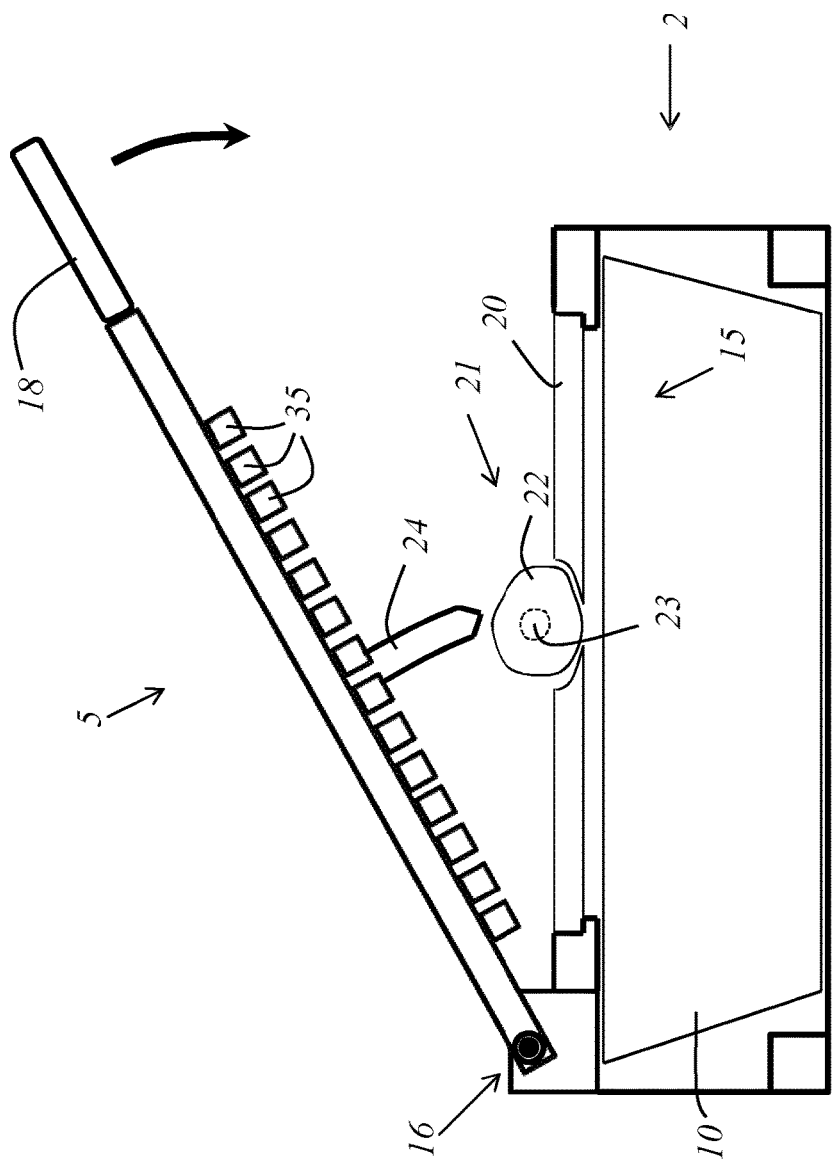
Figure 8:
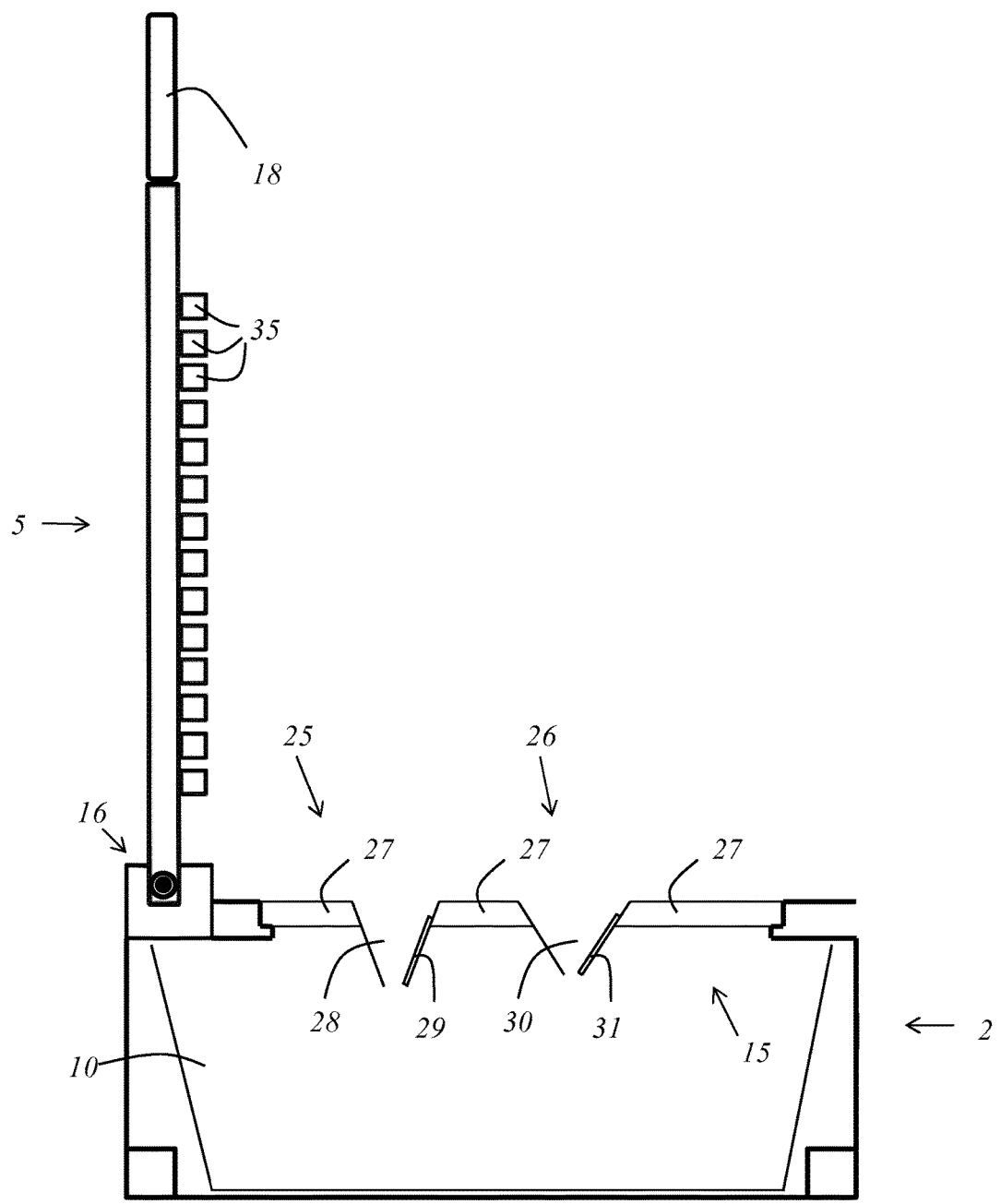
Figure 9:
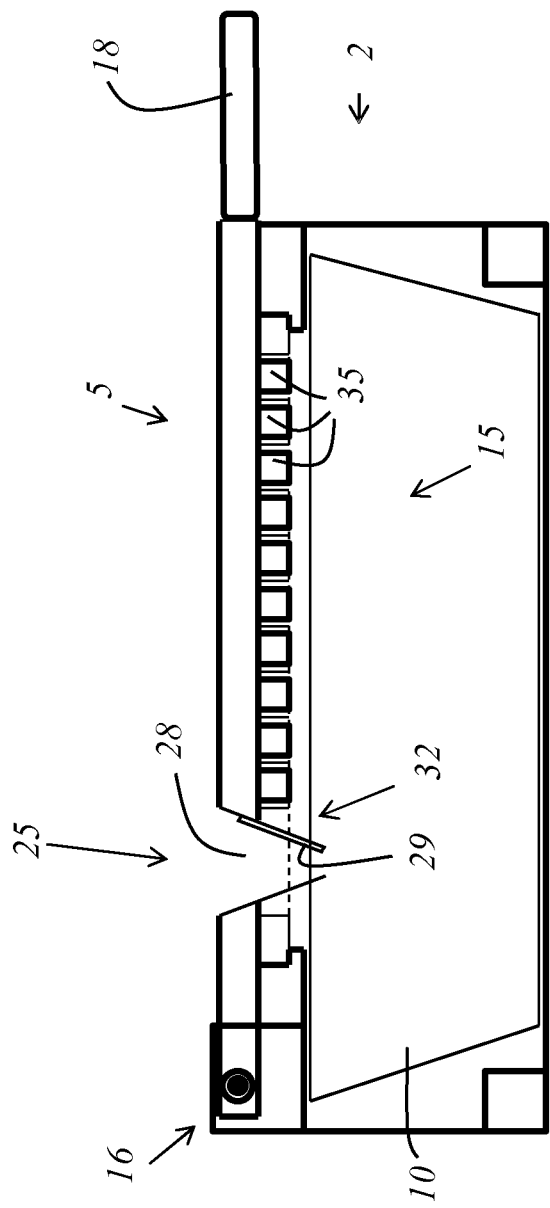
Figure 10:
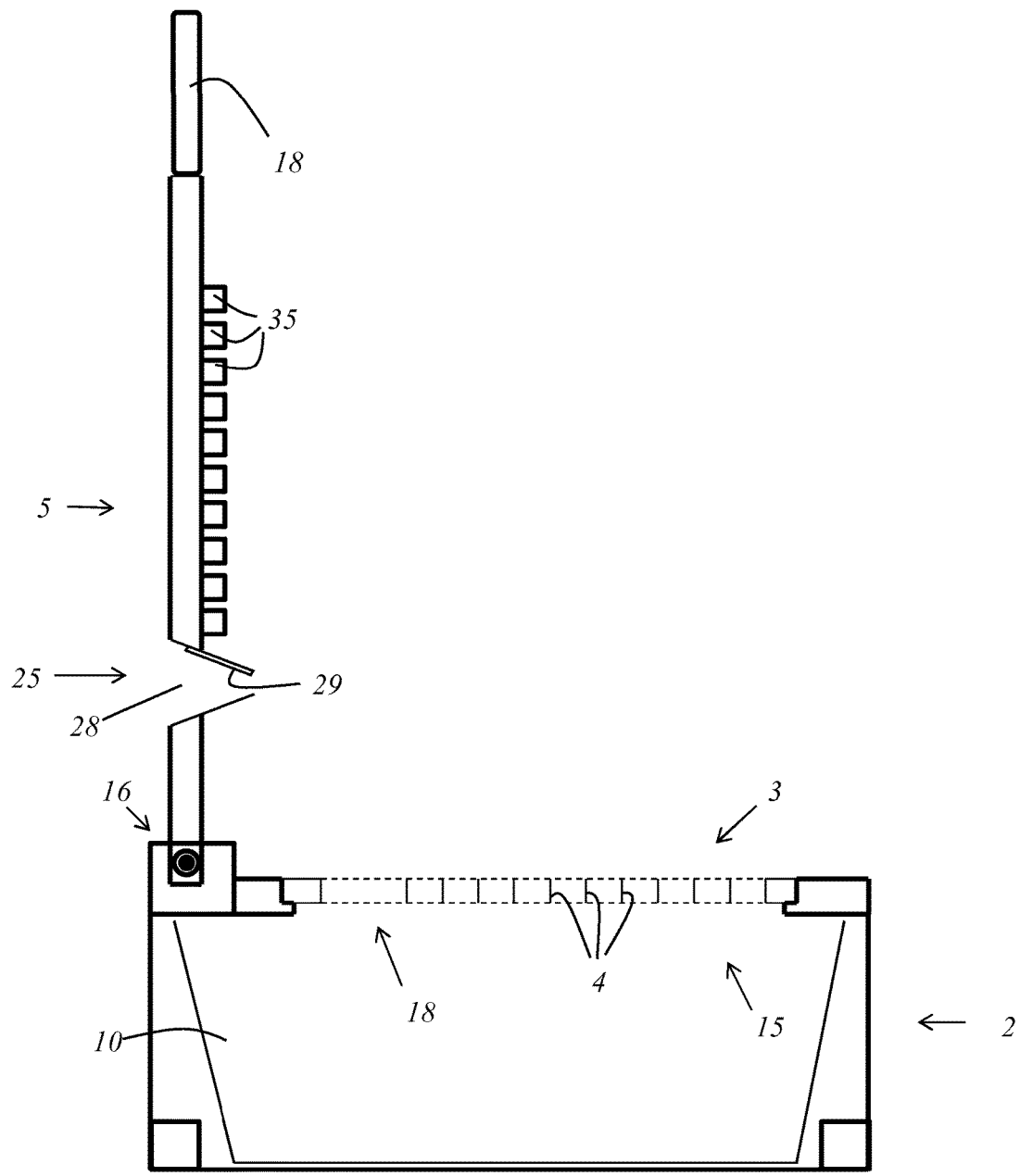
Figure 11:
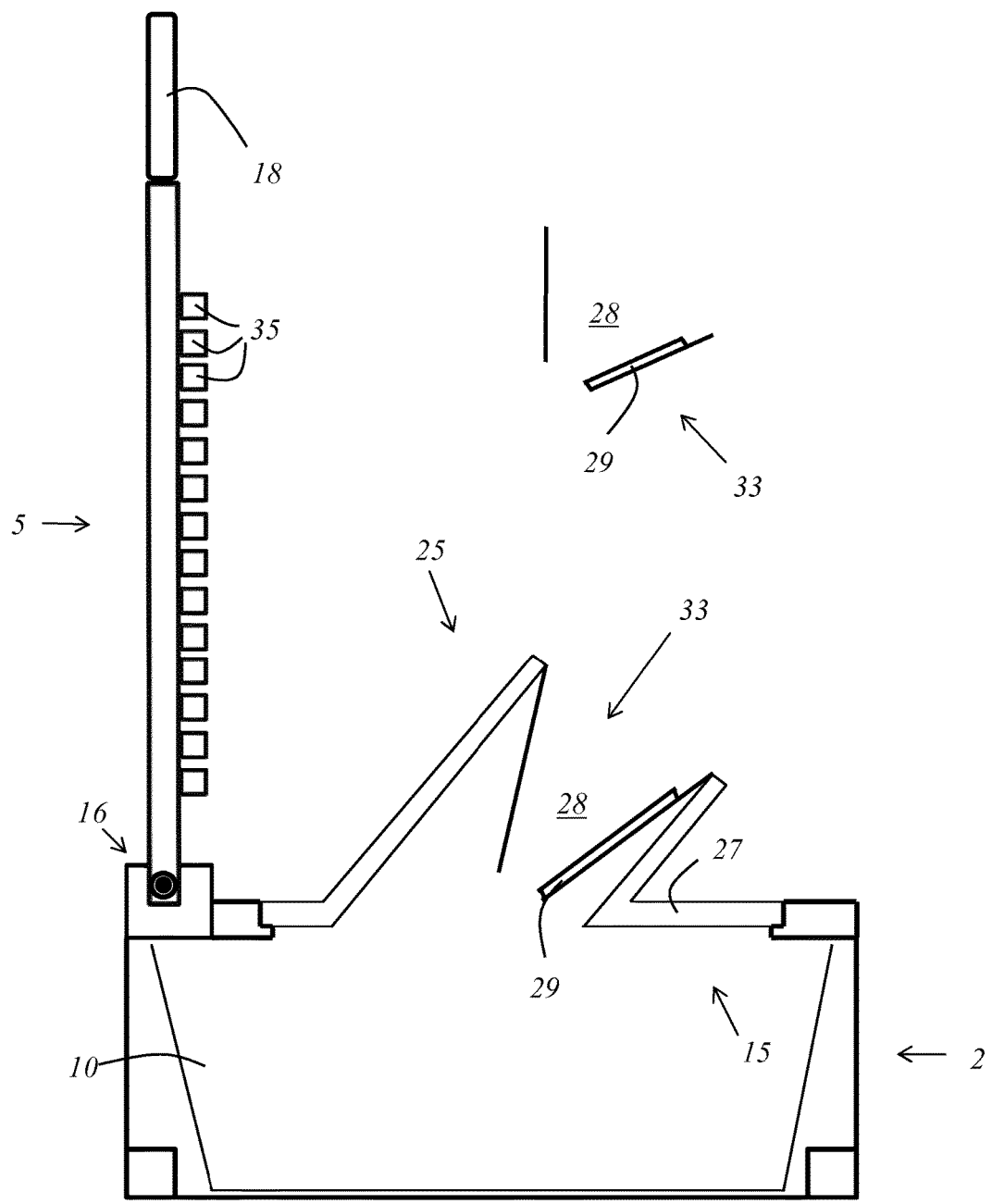

The subject matter of the invention is schematically illustrated in the drawing and will be described below on the basis of the figures, wherein identical elements or elements of identical action are normally denoted by the same reference signs. In the drawing:

FIG. 1 is a schematic illustration of an exemplary embodiment of a food comminution device according to the invention in a first setting-down orientation for the use of a first comminution tool, FIG. 2 shows the food comminution device in the first setting-down orientation with graters removed, FIG. 3 shows the food comminution device in a further setting-down orientation for the use of a further comminution tool, FIG. 4 shows, in a sectional illustration, another exemplary embodiment of a food comminution device according to the invention during a comminution process, FIG. 5 shows, in a sectional illustration, the other exemplary embodiment at the start of a pitting process, FIG. 6 shows, in a sectional illustration, the other exemplary embodiment after the stone has been pushed out, FIG. 7 shows, in a sectional illustration, a further exemplary embodiment of a food comminution device according to the invention, FIG. 8 shows a fourth exemplary embodiment of a food comminution device according to the invention, converted for cutting spiral-shaped ribbons, FIG. 9 shows a fifth exemplary embodiment of a food comminution device according to the invention, designed for cutting spiral-shaped ribbons, FIG. 10 shows the fifth exemplary embodiment with the actuation part open, and FIG. 11 shows a fifth exemplary embodiment of a food comminution device according to the invention, designed for cutting spiral-shaped ribbons.

DETAILED DESCRIPTION OF THE INVENTION

FIG. 1 shows an exemplary embodiment of a food comminution device according to the invention in a first setting-down orientation for the use of a first comminution tool 1. The food comminution device has a base part 2 which, as an outer contour, has the outer contour of a cuboid. The base part 2 bears a removable cutting part 3 which has multiple cutting blades 4. Also articulatedly fixed to the base part is an actuation part 5 which, for pushing food items for comminution through the cutting part 3, can be pivoted from a loading position toward the cutting part 3 into a closed position and subsequently from the closed position back into the loading position. The cutting part 3 and the actuation part are constituent parts of the first comminution tool 1. Further comminution tools, specifically a fine grater 6, a coarse grater 7 and, on the underside, a slicer 8, are arranged on the base part. A collecting container 10 can be slid in through an opening 9 in the square face side of the base part 2.

The collecting container 10 is preferably always slid in such that its filling opening 11 faces toward the comminution tool which is respectively to be used and which is directed upward. In the setting-down orientation of the base part shown, the collecting container is inserted such that its filling opening faces toward the cutting part 3, such that the food items that are pushed through the cutting part and comminuted automatically fall into the collecting container 10.

If it is sought to use a further comminution tool instead of the first comminution tool 1, the collecting container 10 is firstly removed from the base part 2, the base part is rotated such that the further comminution tool to be used is oriented upward, and subsequently, the collecting container 10 is inserted again with its filling opening oriented upward. FIG. 3 shows this, by way of example, with regard to the use of the further comminution tool in the form of a slicer 8.

FIG. 2 shows the food comminution device with fine grater 6 removed and coarse grater 7 removed. The fine grater 6 and the course grater 7 can be temporarily detached from the base part 2 preferably without the use of tools and non-destructively, for example for a cleaning process.

Also visible in FIG. 2 is the further comminution tool in the form of a slicer 8, which in this setting-down orientation is situated at the bottom and which has a slicer blade 12 and a slide path 13, this being clearly visible in particular in FIG. 3.

The base part 2 has, on the face side situated opposite the face side with the insertion opening 9, a window 14 through which the fill level of the preferably translucent collecting container 10 can be inspected, without the need to remove the collecting container 10 from the base part 2.

The base part 2 preferably has, at its corners, in each case one supporting foot which protrudes in all three spatial directions. For better clarity, the supporting feet are however not shown.

FIG. 4 shows, in a sectional illustration, another exemplary embodiment of a food comminution device according to the invention during a comminution process. For better clarity, the further comminution tools that are arranged on their surfaces of the base part 2 are not shown. The food comminution device illustrated in FIG. 4 has a base part 2 which has a receptacle 15 for a cutting part 3. The base part 2 is articulatedly connected to an actuation part 5 by way of an articulated connection 16, in such a way that, in order to push through food items 17 for comminution, the actuation part 5 can be pivoted toward the cutting part 3. The cutting part 3 has multiple cutting blades 4, between which pressing plungers 35 of the actuation part 5 protrude during the comminution process. At the free end of the actuation part 5 there is arranged a handle 18.

FIG. 5 shows the device at the start of a pitting process. To be able to perform a pitting process, the actuation part 5 has been replaced with a further actuation part 19, which has a pushing-out spike 24. For this purpose, the articulated connection 16 of the actuation part 5 to the base part 2 has been released, and instead, the further actuation part 19 has been articulatedly connected to the base part 2. Furthermore, a stone fruit holder 20 has been inserted, instead of the cutting part 3, into the receptacle 15, which stone fruit holder is designed to hold a piece of stone fruit 21, such as for example a cherry 22, which has a stone 23 to be pushed out, in a pitting position.

During the pitting process, the further actuation part 19 is pivoted in the direction of the base part 2, such that, by way of the pivoting movement of the pushing-out spike 24 relative to the stone fruit holder 20, the stone 23 of the piece of stone fruit 21 held in the stone fruit holder 20 is pushed out of the stone fruit 21, as illustrated in FIG. 6. Here, the stone 23 that has been pushed out falls into the collecting container 10. After the pitting process, the further actuation part 19 can be pivoted upward again, and the pitted piece of stone fruit 21 can be removed.

FIG. 7 shows another exemplary embodiment of a device according to the invention, in which the pushing-out spike 24 for carrying out a pitting process is fastened by way of a plug-type connection (not illustrated in any more detail) to the base part 5 which has the pressing plunger 35. In this exemplary embodiment, the pitting process itself is performed analogously to that illustrated in FIGS. 5 and 6.

FIG. 8 shows a fourth exemplary embodiment of a food comminution device according to the invention, converted for cutting spiral-shaped ribbons, In terms of basic construction, the fourth exemplary embodiment may in particular be designed similarly to the exemplary embodiment illustrated in FIG. 4.

For conversion for the cutting of spiral-shaped ribbons, the cutting part 3 has been removed from the receptacle 15 and, instead, a spiral cutter 25 in the form of a sharpener has been inserted into the receptacle 15. The spiral cutter 25 has a holding plate 27 which, in terms of shape and size, has the same outer contour as the cutting part 3. This makes it possible for the spiral cutter 25 to be temporarily fixed, instead of the cutting part 3, in the receptacle 15 of the base part 2 without the need for additional fixing components. Furthermore, a further spiral cutter 26 is held in the holding plate 27 of the spiral cutter 25.

The spiral cutter 25 has a conical receiving chamber 28 for the insertion of food items such as for example a carrot or a radish or a cucumber, on the wall of which receiving chamber there is arranged a cutting blade 29. By rotating the food item that has been inserted into the receiving chamber 28, the tip of said food item comes into operative connection with the cutting blade 29, whereby a spiral-shaped ribbon (not illustrated) is separated off by way of a cutting action. Furthermore, the wall of the receiving chamber 28 has an opening (not illustrated) through which the spiral-shaped ribbon can pass out of the receiving chamber 28. The spiral-shaped ribbon is automatically collected in the collecting container 10.

The further spiral cutter 26 in the form of a sharpener is of a different size than the spiral cutter 25. Furthermore, the further receiving chamber 30 of the further spiral cutter 26 has a different wedge angle than the receiving chamber 28 of the spiral cutter 25. On the wall of the further receiving chamber 30 there is arranged a further cutting blade 31 which projects into the further receiving chamber 30 and which separates off a spiral-shaped ribbon (not illustrated) from a food item that is rotated in the further receiving chamber about the central axis of rotation of the further receiving chamber 30. The wall of the further receiving chamber 30 also has an opening through which the spiral-shaped ribbon that is separated off there can emerge from the further receiving chamber 30 and thus passes into the collecting container 10.

FIGS. 9 and 10 show a fifth exemplary embodiment of a food comminution device according to the invention, designed for cutting spiral-shaped ribbons. In this embodiment, the spiral cutter 25 in the form of a sharpener is arranged in the actuation part 5.

The actuation part 5 has a first section with pressing plungers 35 which serve for pushing food items for comminution through a cutting part 3, which is equipped with cutting blade parts 4, by virtue of the actuation part 5 been pivoted toward the cutting part 3. The spiral cutter 25 is arranged in a second section of the actuation part 5.

In this exemplary embodiment, the cutting part 3 has a passage opening 32 which is free from cutting blade parts 4. When the actuation part 5 is closed, a part of the spiral cutter 25 projects through the passage opening 32. Furthermore, the spiral-shaped ribbon (not illustrated) that is cut off can pass through the passage opening 32 into the collecting container 10.

The spiral cutter 25 has a conical receiving chamber 28 for the insertion of food items such as for example a carrot or a radish or a cucumber, on the wall of which receiving chamber there is arranged a cutting blade 29. By rotating the food item that has been inserted into the receiving chamber 28, the tip of said food item comes into operative connection with the cutting blade 29, whereby the spiral-shaped ribbon (not illustrated) is separated off by way of a cutting action. Furthermore, the wall of the receiving chamber 28 has an opening (not illustrated) through which the spiral-shaped ribbon can pass out of the receiving chamber 28.

FIG. 11 shows a fifth exemplary embodiment of a food comminution device according to the invention, designed for cutting spiral-shaped ribbons. In this exemplary embodiment, the spiral cutter 27 has a holding plate 27 into which at least one of several different cutting inserts 33 can be selectively inserted. The cutting inserts 33 have in each case a conical receiving chamber 28 for the insertion of food items, on the wall of which receiving chamber there is arranged in each case one cutting blade 29, and in which receiving chamber the food item can be rotated. The cutting inserts 33 may differ in particular in terms of their shape and/or size and/or in terms of the thickness and/or width of the spiral-shaped ribbons that can be cut therewith and/or in terms of the number of spiral-shaped ribbons produced simultaneously during a cutting process.

The cutting insert 33 inserted in each case into the holding plate 27 may be fixed for example by way of a detent device or a bayonet fastening so as to be detachable again, in particular without the use of tools.

The holding plate 27 has, in terms of shape and size, the same outer contour as a cutting part 3 that can be inserted into the receptacle. This makes it possible for the spiral cutter 25 to be temporarily fixed, instead of a cutting part 3, in the receptacle 15 of the base part 2 without the need for additional fixing components. Furthermore, the holding plate has a cylindrical projection 34 into which in each case one cutting insert 33 can be inserted.

LIST OF REFERENCE NUMERALS

1 First comminution tool
2 Base part
3 Cutting part
4 Cutting blades
5 Actuation part
6 Fine grater
7 Coarse grater
8 Slicer
9 Insertion opening
10 Collecting container
11 Filling opening
12 Slicer blade
13 Slide path
14 Window
15 Receptacle
16 Articulated connection
17 Food items
18 Handle
19 Further actuation part
20 Stone fruit holder
21 Stone fruit
22 Cherry
23 Stone
24 Pushing-out spike
25 Spiral cutter
26 Further spiral cutter
27 Holding plate
28 Receiving space
29 Cutting blade
30 Further receiving space
31 Further cutting blade
32 Passage opening
33 Cutting insert
34 Cylindrical projection
35 Pressing plunger

What is claimed is:

1. A food comminution device comprising:
a base part,
a cutting part supported by the base part, and
an actuation part articulatedly fixed to the base part, wherein the actuation part can be pivoted from a loading position toward the cutting part into a closed position in order to push food items for comminution through the cutting part and can subsequently be pivoted from the closed position into the loading position again, wherein
a. the base part has an outer contour of a cuboid, and
b. the food comminution device has a collecting container, and, c. on one face surface of the base part, there is provided an opening for the sliding-in of the collecting container into the base part, and d. the cutting part is arranged on a first side surface of the base part, the first side surface being adjacent to the face surface, and e. the cutting part and the actuation part are constituent parts of a first comminution tool, and f. the base part is a constituent part of a further comminution tool, and/or at least one further comminution tool is fixed to the base part, wherein the further comminution tool is arranged on a further side surface of the base part, which further side surface is adjacent to the face surface, and g. the collecting container can be arranged in the base part selectively in a first position, in which said collecting container collects food items comminuted by way of the first comminution tool, or in a second position, which differs from the first position and in which said collecting container collects the food items comminuted by way of the second comminution tool.

2. The food comminution device as claimed in claim 1, wherein a. the at least one further comminution tool of the food comminution device includes a slicer, and/or b. the at least one further comminution tool of the food comminution device includes a grater, and/or c. the at least one further comminution tool of the food comminution device includes a coarse grater, and/or d. the at least one further comminution tool of the food comminution device includes a fine grater as a further comminution tool, and/or e. the at least one further comminution tool of the food comminution device includes a spiral cutter as a further comminution tool, and/or f. the at least one further comminution tool of the food comminution device includes a pitting means for the pitting of stone fruit.

3. The food comminution device as claimed in claim 1, wherein a. the at least one further comminution tool is formed from components which differ from the cutting part and the actuation part, or b. the at least one further comminution tool has no components in common with the first comminution tool, or c. the base part is simultaneously a constituent part both of the first comminution tool and of the second comminution tool, or d. the at least one further comminution tool has only the base part in common with the first comminution tool, or e. the first comminution tool and the at least one further comminution tool are operable independently of one another.

4. The food comminution device as claimed in claim 1, wherein the base part is in the form of a frame.

5. The food comminution device as claimed in claim 4, wherein a. the first comminution tool and the at least one further comminution tool are arranged or arrangeable separately from one another in each case on and in one of the different surfaces of the base part, and/or b. at least one comminution tool is arranged on or in one of the different surfaces of the base part, and that surface which is situated opposite the surface is formed as a setting-down surface which is equipped with supporting feet and onto which the base part can be set down in order for the comminution tool to be used, and/or c. at least one comminution tool is arranged on or in one of the different surfaces of the base part, and that surface which is situated opposite the surface is formed as a setting-down surface which is equipped with supporting feet and onto which the base part can be set down in order for the comminution tool to be used, wherein the setting-down surface has another comminution tool.

6. The food comminution device as claimed in claim 1, wherein a. at least one comminution tool or at least a part of one comminution tool is fixed or fixable to the base part so as to be detachable, and/or b. multiple comminution tools or in each case at least parts of different comminution tools are detachably fixed or fixable, independently of one another, to the base part, and/or c. at least one further comminution tool or at least a part of one further comminution tool is detachably fixed or fixable to the base part.

7. The food comminution device as claimed in claim 6, wherein a. at least one detent element is provided for the detachable fixing of the first comminution tool or of the further comminution tool or of a component of the first comminution tool or of a component of the further comminution tool, and/or b. a locking device is provided by means of which the actuation part can be fixed in the closed position.

8. The food comminution device as claimed in claim 1, wherein at least one comminution tool is arranged non-detachably on the base part or is at least partially produced integrally with the base part.

9. The food comminution device as claimed in claim 1, wherein the food comminution device has a stone fruit holder for holding at least one piece of stone fruit, and has at least one pushing-out spike such that, by means of a pivoting movement of the pushing-out spike relative to the stone fruit holder, the stone of a piece of stone fruit held by the stone fruit holder can be pushed out of the stone fruit.

10. The food comminution device as claimed in claim 9, wherein a. the pushing-out spike is fixed to the actuation part or fixable to the actuation part, or b. a further actuation part is provided which has the pushing-out spike and which is articulatedly fixable to the base part instead of the actuation part.

11. The device as claimed in claim 1, wherein the base part has a receptacle into which the cutting part or a stone fruit holder or a spiral cutter can be selectively inserted in an accurately fitting manner and/or with detent action.

12. The device as claimed in claim 11, wherein the spiral cutter has a holding plate which, in terms of shape and size, has the same outer contour as the cutting part, and/or in that the stone fruit holder has a holding plate which, in terms of shape and size, has the same outer contour as the cutting part.

13. The food comminution device as claimed in claim 1, wherein a. the base part has a receptacle for the collecting container, which receptacle has a fastening device for the temporary fixing of the collecting container, and/or b. the collecting container can be arranged in the base part in such a way that it automatically collects the comminuted food items, and/or c. the collecting container can be arranged in the base part selectively in a first rotational position of the base part relative to the collecting container, in which said collecting container collects food items comminuted by way of the first comminution tool, or in a second rotational position of the base part relative to the collecting container, which differs from the first rotational position and in which said collecting container collects food items comminuted by way of the second comminution tool.

14. The food comminution device as claimed in claim 1, wherein the base part has at least one window through which the collecting container arranged in the base part, and/or the fill level of the collecting container arranged in the base part, can be viewed.

15. The food comminution device as claimed in claim 1, wherein a. the food comminution device is designed to be set down on a worktop for a comminution process and/or b. the food comminution device is designed to be set down on a worktop selectively in one of several different setting-down orientations for a comminution process, and/or c. the food comminution device is designed to be set down on a worktop in a first setting-down orientation for a comminution process using the first comminution tool and in a further setting-down orientation, which differs from the first setting-down orientation, for a comminution process using the further comminution tool, and/or d. each comminution tool is assigned one of several different setting-down orientations, and in that the food comminution device is designed to be set down on a worktop in the setting-down orientation assigned to one of the comminution tools for a comminution process using that comminution tool.

16. The food comminution device as claimed in claim 15, wherein a. the base part has supporting feet which serve exclusively for setting down in a single one of the possible setting-down orientations, and/or b. the base part has supporting feet on at least one surface thereof.

17. The food comminution device as claimed in claim 1, wherein a. the food comminution device has supporting feet for the setting-down of the food comminution device in different setting-down orientations, and/or b. the base part has supporting feet, and/or c. supporting feet are provided which are produced from an elastic material and/or from a material with high static friction, and/or d. the base part has supporting feet which project beyond the comminution tools.

18. The food comminution device as claimed in claim 17, wherein a. at least one supporting foot is arranged such that it can be used for different setting-down orientations, and/or b. the supporting feet are arranged at the edges and/or along the edges of the base part, which is in the form of a cuboid, and/or c. the supporting feet are arranged at the corners of the base part, which is in the form of a cuboid.

19. The food comminution device as claimed in claim 1, wherein the base part is produced as an injection-moulded part, or the base part has at least one component produced as an injection-moulded part, or the base part is assembled from multiple components which are produced as injection-moulded parts.

* * * * *